United States Patent Office 3,280,005
Patented Oct. 18, 1966

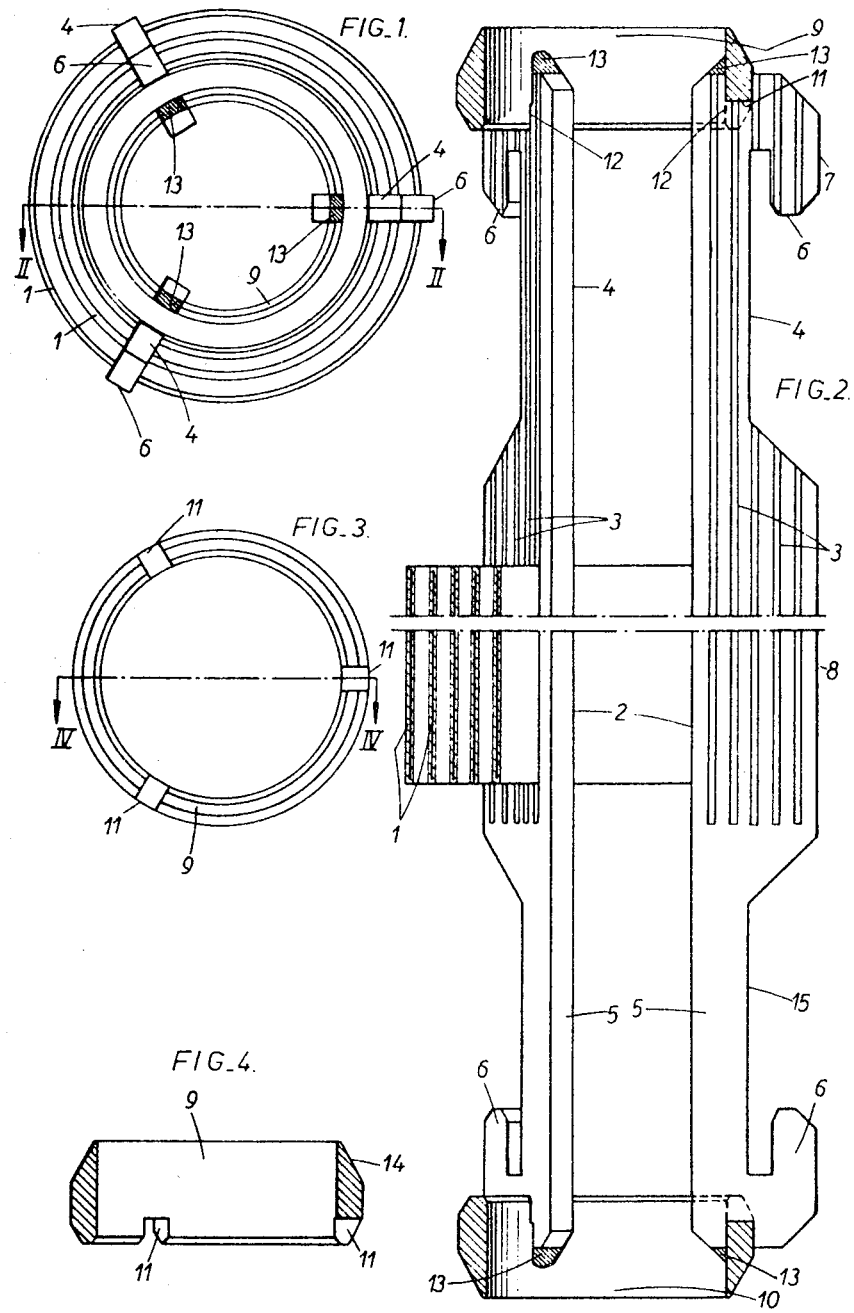

3,280,005
FUEL ELEMENT FOR EXPERIMENTAL NUCLEAR REACTORS
Jacques Planquart, Brussels, Belgium, and Jacques Herpin, Le Vesinet, France, assignors to the Belgian Organization: "Centre d'Etude de l'Energie nucleaire" (C.E.N.), in Dutch: "Studiecentrum voor Kernenergie," Brussels, Belgium
Filed Sept. 3, 1963, Ser. No. 306,035
Claims priority, application Netherlands, Sept. 6, 1962, 282,950
1 Claim. (Cl. 176—76)

This invention relates to a fuel element for experimental nuclear reactors, said element being comprised of a plurality of nuclear fuel plates which are joined edge to edge by radially-arranged lengthwise braces, so as to form coaxial tubes, said braces being provided beyond the plates with extensions. Such an element may be introduced together with a sample support inside a nuclear reactor, which enables to irradiate a sample which is located centrally of the element. Several assembly devices have already been proposed to secure an element with a central hole and which is self-supporting. A known type of fuel element for experimental reactors comprises a central tube to the ends of which are attached the assembly members for the braces and the locating members for the element inside the reactor. This embodiment has several drawbacks, for example the possible size of the experiment is too small, it is difficult to center the experiment and maximum use is not made of the fast neutron flux generated by the element.

This invention has for its object to obviate these drawbacks.

For this purpose, the fuel element according to the invention comprises radial lengthwise extending braces, a plurality of concentric spaced cylinders, each of said cylinder comprising a plurality of nuclear fuel-containing coaxial cylindrical sections extending between said braces and secured thereto, a notch provided in the end edges of the braces, a notched ring for joining said braces at each end thereof, the notches of the rings dovetailing with the notches in said brace ends, the outside wall of said ring being chamfered towards the notched edge adjacent thereof, the length of the fuel containing sections being substantially shorter than the length of the braces and the distance between the notched end of one ring and the edges of the cylindrical fuel containing sections facing said notched end being about equal to the diameter of the external cylinder-forming coaxial fuel containing sections.

A notched ring attached to the end, similarly notched, of plates with a center section comprised of nuclear fuel has been described in U.S. Patent No. 2,914,454 filed on August 9, 1956 and granted on November 24, 1959. The element disclosed in said patent is however unsuited for an experimental reactor with high thermal flux, the plate geometry being different from the one proposed for the element according to the invention and the stiffness of the whole assembly is substantially lower than the one obtained with the present invention; moreover, the center section of fuel material extends up to adjacent the plate edge, so that the ring is located at the entrance to the channels which are left between the plates and it consequently disturbs the flow of the cooling fluid; this disturbance is not acceptable, particularly when the cooling fluid is made of water which, due to the high thermal power of the experimental reactors for which the fuel elements according to the invention are advantageously intended, has to flow with high speeds.

Other details and features of the invention will stand out from the description given below by way of non limitative example and with reference to the accompanying drawings, in which:

FIG. 1 is a plan view of a fuel element according to the invention.

FIG. 2 is a section view, with parts broken away along line II—II of FIG. 1.

FIG. 3 is a plan view of one of the rings which are arranged at the ends of the element shown in FIGS. 1 and 2.

FIG. 4 is a section view along line IV—IV of FIG. 3.

In the various figures, the same reference numerals pertain to similar parts.

The element shown in FIGS. 1 and 2 of the drawings comprises fuel plates of clad nuclear fuel material such as 1 which are approximately 120° of arc shaped formation bent and arranged between three braces 2, so as to form thus coaxial cylindrical tubes. The plates are introduced in grooves such as 3 which are provided in the braces 2 in which they are retained by any appropriate means.

The braces 2 are provided at each end thereof with extensions which are respectively shown in 4 and 5. These extensions have two bent sections such as 6, edge 7 of which, lies substantially the same distance away from said axis as the outside edge 8 of the braces proper. These sections 6 are used for connecting extending members (not shown) for localizing vertically the element inside the reactor.

To insure the required stiffness, these are provided end rings 9 and 10 which are put over the end sections of the extensions 4 and 5. Ring 9 is shown in FIGS. 3 and 4. In one of the end sides of the ring are provided three notches such as 11, while corresponding notches 12 are made in the end sections of extensions 4 and 5. It is thus possible to fit ring 9 and the extensions 4 so as to engage the bottom of a notch 11 with the bottom of the corresponding notch 12 and to have the sides of the notch 11 overlap the end of extension 4, while the sides of notch 12 overlap the inside surface and the outside surface of the ring. The attachment is completed by soldering in places such as 13.

In FIG. 4 is clearly shown the shape of the cross-section of the rings which gets thinner on that side opposite the side in which are provided the notches 11. Such thinning-down is made with a bevelled edge 14. There is thus obtained an optimum stiffness with a ring of minimum volume, in such a way that the flow of the cooling fluid is as slightly disturbed as possible. The extensions 4 and 5 are given such a length as not to oppose the action of the cooling fluid. This length is about twice the distance from that edge, such as 15 which in the extensions 4 and 5 is the farthest away from the element axis. In other words, a cylindrical surface which would contact said edges 15 would have a diameter substantially equal to the length of extensions 4 and 5.

In FIG. 2 it is shown that the grooves 3 are extended to the ends of extensions 4 so as to ease the fitting in of the fuel plates 1.

By means of the measures described there has thus been provided a fuel element which is stiff enough, which has a continuous central bore that allows easy introducing of a sample support and which is suitably cooled.

We claim:

A cylindrical fuel element for experimental nuclear reactor, comprising radial lengthwise extending braces, a plurality of concentric spaced cylinders, each of said cylinder comprising a plurality of nuclear fuel-containing coaxial cylindrical sections extending between said braces and secured thereto, a notch provided in the end edges of the braces, a notched ring for joining said braces at each end thereof, the notches of the rings dovetailing with the notches in said brace ends, the outside wall of said ring being chamfered towards the notched edge adjacent thereof, the length of the fuel containing sections being substantially shorter than the length of the braces and the distance between the notched end of one ring and the edges of the cylindrical fuel containing sections facing said notched end being about equal to the diameter of the external cylinder-forming coaxial fuel containing sections.

References Cited by the Examiner

UNITED STATES PATENTS

| | | | |
|---|---|---|---|
| 2,914,454 | 11/1959 | Gurinsky et al. | 176—78 |
| 3,074,873 | 1/1963 | Kling et al. | 176—76 X |
| 3,138,534 | 6/1964 | Frisch et al. | 176—83 X |

FOREIGN PATENTS

| | | |
|---|---|---|
| 817,265 | 7/1959 | Great Britain. |
| 884,769 | 12/1961 | Great Britain. |

OTHER REFERENCES

"Nucleonics," vol. 16, No. 7, July 1958, page 44.

L. DEWAYNE RUTLEDGE, *Primary Examiner.*

REUBEN EPSTEIN, *Examiner.*

R. L. GRUDZIECKI, *Assistant Examiner.*